United States Patent [19]

Kabakov et al.

[11] Patent Number: 4,979,374
[45] Date of Patent: Dec. 25, 1990

[54] GEOTHERMAL HEAT- AND WATER SUPPLY PLANT

[76] Inventors: Vladimir I. Kabakov, Rostovskaya naberezhnaya, 3, kv. 144; Eduard I. Dryndrozhik, ulitsa Miklukho-Maklava, 18, kv. 959; Ivan T. Aladiev, ulitsa Georgiu-Dezha, 3, kv. 11, all of Moscow, U.S.S.R.

[21] Appl. No.: 486,926

[22] Filed: Mar. 1, 1990

[51] Int. Cl.$^5$ .............................................. F25B 27/00
[52] U.S. Cl. ................................... 62/238.2; 237/2 B; 60/641.5
[58] Field of Search ......................... 60/641.2, 641.5; 237/2 B; 62/238.6

[56] References Cited

U.S. PATENT DOCUMENTS 4,382,368  5/1983  Dittell ................... 62/238.6

FOREIGN PATENT DOCUMENTS 823762   4/1981  U.S.S.R. .
1134854  1/1985  U.S.S.R. .

*Primary Examiner*—Allen M. Ostrager
*Attorney, Agent, or Firm*—Fleit, Jacobson, Cohn, Price, Holman & Stern

[57] ABSTRACT

A geothermal heat- and water supply plant comprises a geothermal well to remove brine which communicates with a separator which, in turn, communicates in the steam phase with a jet pump and a high pressure stage of an injector, and in the fluid phase—with the cooled side of a heat exchanger which communicates with the jet pump. Water is drawn from the injector outlet to water and heat supply systems, and once used therein, the water is fed to one inlet of the heat pump whose one outlet communicates with the injector high pressure stage. The other outlet of the heat pump communicates with the jet pump outlet, and the other outlet—with the well for pumping the brine.

2 Claims, 1 Drawing Sheet

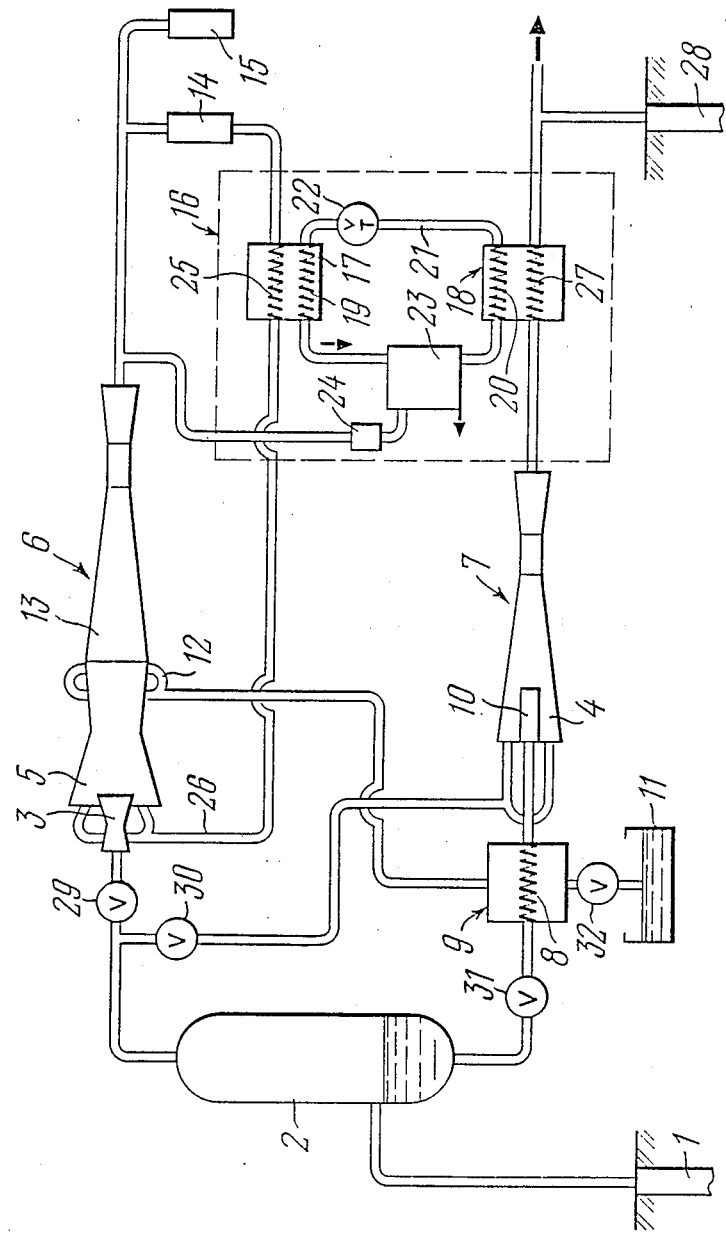

GEOTHERMAL HEAT- AND WATER SUPPLY PLANT

FIELD OF THE INVENTION

The present invention relates to thermal power plants, and more specifically, to geothermal heat-and water supply plants.

The invention can be utilized in thermal power engineering for heating and hot water supply of residential, production and service buildings. At the same time, when operating the claimed plant it is possible to extract chemical elements and compounds present in the brine.

BACKGROUND OF THE INVENTION

Today in most geothermal heat- and water supply plants provision is made for the return of the brine used therein into a geothermal deposit. Centrifugal pumps are used for those purposes as well as for transporting hot brine to consumers. These pumps feature high metal intensity and short service life under the conditions of work with hot brines. For these same purposes in a number of plants use is made of heat pumps which are more reliable and durable compared to centrifugal ones, but require greater power consumption. Therefore, capacity and economical efficiency are the principal requirements set to geothermal plants.

Known in the art is a heat- and water supply plant using the heat of a geothermal source (SU, A, No. 823762). The plane incorporates a geothermal source with which the main and auxiliary heat pumps communicate, the water from the outlet of the first pump being fed to a hot water supply system and from the outlet of the second one—to a water tower designed to deliver water to a process—potable water supply system. Each heat pump comprises a condenser, an evaporator and a compressor with an electric drive. A heat supply system boiler communicates with the geothermal source via the main heat pump condenser. The plant also has a cooling chamber arranged between the evaporator and the main heat pump condenser. The evaporator of the auxiliary heat pump communicates with the main heat pump condenser via a three-way cock and a check valve.

In winter time the prior art plant is used for heating which is effected by means of the main heat pump and hot water supply using an auxiliary heat pump. In summer the heating system is cut off and the main heat pump is connected to the cooling chamber. An increase in refrigerating capacity of the main heat pump, as well as the plant efficiency, when the latter operates in summer time, are ensured by feeding the water, preheated in the auxiliary heat pump evaporator, to the main heat pump condenser.

In winter time, it is impossible to increase efficiency of the prior art plant.

Besides, using an electrically driven compressor in the heat pumps of the prior art plant calls into play additional power sources which impairs its efficiency. Note that in the hot water supply system use is made of the water of the same chemical composition as in the geothermal source which normally features a high content of mineral salts. In the prior art plant there is not provision for the return of water to the geothermal deposit after it is used in the heat supply system. This means that a long operation of the geothermal deposit depletes its reserves and brings about salinization of soil.

The geothermal heat and water supply plant (SU, A, No. 1134854) allows for the return of the used brine to the geothermal deposit. The plant comprises a geothermal well to extract the brine in the form of a steam-and-fluid mixture communicating with the separator which in the steam phase communicates with a jet pump and with a high-pressure stage of the injector, communicating with a pipeline for transporting water after it is used in the heat supply system, and in the fluid phase—with the cooled side of the heat exchanger communicating with a jet pump whose outlet communicates with a well for pumping the brine liquid phase, and a fresh water source communicating with the heated side of the heat exchanger which, in turn, communicates with the low pressure stage of the injector from the outlet of which the water is drawn into the heat- and hot water supply systems.

In the prior art plant the brine is supplied from the jet pump outlet directly into the well to pump the brine fluid phase, while the water, once used in the heat supply system, is fed to the high pressure stage of the injector. By virtue of the injector the water is circulated in the heat supply system and fresh water is taken from the source. Once used in the heat supply system, the water returning to the high pressure stage has a fairly high temperature which determines the pressure corresponding to this temperature. Given appreciable pressure in the high pressure stage of the injector, the latter shows unstable operation, consuming less amount of steam and fresh water, which reduces pressure at the injector outlet and diminishes the plant capacity as a whole.

In the prior art plant the jet pump is designed to pump the brine fluid phase to a geothermal deposit. To overcome the well resistance, one should provide pressure at the jet pump outlet the value of which is specified by the amount of steam fed thereto.

An elevation of pressure of the brine being pumped by increasing the steam consumption brings about a decline in the amount of steam fed to the injector and the latter's unstable operation. In addition, the brine temperature at the pumping well inlet is insignificant which creates additional resistance caused by a high viscosity of the brine.

Thus, in the known plant the geothermal deposit thermal energy is used ineffectively, thus impairing the plant efficiency.

DISCLOSURE OF THE INVENTION

It is a general object of the present invention to provide a geothermal heat- and water supply plant featuring high efficiency and capacity.

Another object is to ensure stable operation of the injector.

These objects are attained by that the geothermal heat- and water supply plant, comprising a geothermal well for extracting the brine in the form of a steam-and-fluid mixture communicating with the separator which in the steam phase communicates with the jet pump and with a high-pressure stage of the injector, communicating with a pipeline for transporting the water after it is used in the heat supply system, and in the fluid phase—with the cooled side of the heat exchanger communicating with a jet pump whose outlet communicates with a well for pumping the brine fluid phase, and a fresh water source communicating with the heated side of the heat exchanger which, in turn, communicates with the low pressure stage of the injector from the outlet of which the water is drawn into the heat- and hot water supply systems, according to the invention, incorporates a heat pump to the inlet of which the water, once used in the heat supply system, is fed from the cooling side, and whose outlet communicates with the pipe-line for transporting the water, once used in the heat supply system, in so doing, the heat pump inlet, from the heating side, communicates with the jet pump outlet, and the outlet—with the well for pumping the brine fluid phase.

It is expedient that, given the heat pump has an evaporator and condenser whose heated and cooled sides are interconnected by way of a circuit of an intermediate heat-transfer agent containing a throttle valve and a compressor arranged upstream and downstream the evaporator, respectively, in the direction of the circulation of the intermediate heat transfer agent, the compressor should be provided with a hydraulic drive communicating with the injector outlet.

The claimed geothermal heat- and water supply plant allows the brine consumption from the geothermal well to be increased due to the use of a heat pump, with a simultaneous increase in the consumption of fresh water being fed to heat- and hot water supply systems.

Heating the brine fluid phase before it is pumped to the wall enables one to decrease its viscosity and increase the volume of the fluid being pumped.

Besides, a more stable operation of the injector is attained by feeding the water, whose temperature is lowered upon passing the heat pump, into the high pressure stage of the injector.

Provision of the compressor with a hydraulic drive in the heat pump allows for an independent operation of the plant, i.e., without power consumption from external sources.

Thus, the claimed plant features high efficiency and capacity and does not need additional power sources.

BRIEF DESCRIPTION OF THE DRAWINGS

The invention will become more apparent by way of a specific exemplary embodiment thereof with reference to the accompanying drawing schematically showing the geothermal heat- and water supply plant according to the invention.

BEST MODE TO CARRY OUT THE INVENTION

The geothermal heat- and water supply plant comprises a geothermal well 1 for removing the brine in the form of a steam-and-fluid mixture and communicating with a separator 2. In its steam phase the separator 2 communicates with steam nozzles 3,4 of a high pressure stage 5 of an injector 6 and a jet pump 7, respectively, and in the fluid phase—with a cooled side 8 of a heat exchanger 9 which, in turn, communicates with a fluid nozzle 10 of the jet pump 7.

The plant is also furnished with a fresh water source 11 which communicates with the heated side of the heat exchanger 9 linked with the inlet connections 12 of a low pressure stage 13 of the injector 6.

Hot water is drawn from the injector 6 outlet to a heat supply system 14 and a water supply system 15.

In addition, the plant incorporates a heat pump 16 comprising an evaporator 17 and a condenser 18 whose heated and cooled sides 19, 20 are interconnected by a circuit 21 of an intermediate heat transfer agent containing a throttle valve 22 and a compressor 23. The throttle valve 22 and the compressor 23 are arranged upstream and downstream the evaporator 17, respectively, in the direction of the circulation of the intermediate heat transfer agent denoted by an arrow in the drawing. In the variant described the compressor 23 is provided with a hydraulic drive 24 communicating with the outlet of the injector 6.

Once used in the heat supply system 14, the water is fed to the inlet of the cooled side 25 of the evaporator 17, while its outlet communicates with a pipeline 26 for transporting the water after it is used in the heat supply system. The heated side 27 of the condenser 18 by way of the inlet communicates with the outlet of the jet pump 7, and by way of the outlet—with the wall 28 for pumping the fluid phase of the brine, part of which can be utilized to extract chemical elements and compounds therefrom.

Arranged in the pipelines connecting the separator 2 with the steam nozzles 3,4 of the injector 6 and jet pump 7 and the fluid nozzle 10 of the jet pump 7 are valves 29, 30, 31, respectively, which are intended for regulating the flow rate of the fluid and steam phases of the brine. The pipeline connecting the fresh water source 11 with the heat exchanger 9 accommodates a valve 32 allowing for regulation of fresh water flow rate to the inlet connections 12 of the injector 6.

the geothermal heat- and water supply plant operates as follows.

Pressurized brine in the form of a steam-and-fluid mixture is fed from the geothermal well 1 to the separator 2, where it is divided into fluid and steam phases. The steam having a temperature of 110° to 150° C. goes along a pipeline fitted with valves 29, 30 via the steam nozzles 3,4 and enters the high pressure stage 5 of the injector 6 and the jet pump 7. The brine fluid phase goes along the pipeline provided with a valve 31 and enters the heat exchanger 9 and passing through the cooled side 8 of the latter it gives up heat to the fresh water coming from the source 11 and having a temperature of 5° to 20° C. As the fresh water is heated up to 35°–45° C. in the heat exchanger 9, it is fed into the inlet connections 12 of the low pressure stage 13 of the injector 6. The fresh water consumption is determined by the difference of pressures in the fresh water source 11 and the mixing chamber of the low pressure stage 13 of the injector 6 and is regulated by a valve 32. Pressure in the mixing chamber of the low pressure stage 13 is determined by the pressure and temperature of the medium in the high pressure stage 5. In the injector 6 the brine steam phase is completely condensed, being mixed with water, once used in the heat supply system 14, and the fresh water coming from the source 11, and in the diffuser of the injector 6 pressure increases to 0.3–1.0 MPa to permit transporting the water, whose temperature is 65° to 95° C., to the heat- and water supply systems 14, 15.

Upon passing through the cooled side 8 of the heat exchanger 9, the brine fluid phase enters the mixing chamber of the jet pump 7 via the fluid nozzle 10. The brine steam phase enters the mixing chamber via the steam nozzle 4. In the jet pump 7 the steam phase is condensed to convert thermal energy into mechanical one, with the result that the pressure at the output grows as high as 0.3 to 1.4 MPa compared to 0.1 to 0.5 MPa at the jet pump 7 inlet.

From the jet pump 7 outlet the brine fluid phase, whose temperature is 40° to 60° C., enters the inlet of the heat pump 16 from the heating side, and the water after it is used in the heat supply system 14 is fed to the inlet thereof from the cooling side.

As the water passes through the cooled side 25 of the evaporator 17, it is cooled from 30°–45° C. to 10°–20°

C., giving up heat to the intermediate heat transfer agent (low-boiling fluid) passing via the heated side 19 of the evaporator 17. In the evaporator 17 the intermediate heat transfer agent passes over to the steam phase and, thereupon, it is compressed in the compressor 23. The compressor 23 is provided with a hydraulic drive 24, wherein the water coming from the injector 6 outlet serves as a working medium.

The amount of water consumed for the drive 24 of the compressor 23 is insignificant (roughly 10% of the total water consumption) and this fact does not reduce its flow rate to the heat- and water supply systems 14, 15.

As a result of compression the temperature and enthalpy of the intermediate heat transfer agent grow and the agent proper enters the condenser 18, and passing through the cooled side 20 it is condensed giving up heat to the brine fluid phase which passes through the heated side 27 of the condenser 18 and is directed to the pumping well 28, and if necessary, to the chemical elements recovery system, having a temperature of 80°–95° C.

The throttle valve 22 arranged in the circuit 21 serves to elevate pressure of the intermediate heat transfer agent after the condenser 18.

Using the heat pump 16 in the claimed plant allows the temperature of the water, once used in the heat supply system 14, to be decreased and the temperature of the brine pumped to the well 28 to be increased, thus making a more effective use of the heat. A decline in temperature of the water going along the pipeline 26 to the high pressure stage 5 of the injector brings about a pressure drop in this stage 5 to ensure stable operation of the injector 6 and enables one to increase the consumption of steam from the separator 2 and fresh water from the source 11. Valves 29, 32 serve to regulate the feeding of steam and fresh water to the injector 6. As a result, pressure is elevated and water consumption at the injector 6 outlet is increased to provide greater capacity of the heat- and water supply systems 14, 15.

An increase in the fresh water consumption makes it possible to cool the brine fluid phase with a preset consumption down to a lower temperature or cool a greater volume of the brine fluid phase down to a preset temperature with the aid of a valve 31.

Feeding greater amount of fluid to the jet pump 7 makes its work more effective, because losses due to the mixing of steam and fluid flows are reduced.

Viscosity of the brine is diminished as a result of a rise in temperature of the brine fluid phase before it is pumped into the well 28 which leads to a lower resistance of the well 28.

Given an appreciable content of salts in the brine fluid phase, scale is likely to be formed on the cooled side 8 of the heat exchanger 9. It is desirable that at least two heat exchangers 9, connected in parallel on the cooled side 8, be provided to ensure continuity of heat- and water supply, thus enabling their alternate utilization and requisite washing and repair.

Thus, the heat pump used in the claimed plant makes possible the pumping of greater amount of the brine into the well, i.e., enables one to intensify the operation of the geothermal deposit and protect the soil against salinization. Besides, the plant operates independently featuring high efficiency and capacity.

What is claimed:

1. A geothermal heat- and water supply plant, comprising:
    a geothermal well for removing the brine in the form of a steam-and-fluid mixture;
    a separator communicating with said geothermal well for removing the brine and dividing the steam-and-fluid mixture into a steam and fluid phases;
    a jet pump communicating in the steam phase with said separator and having an outlet;
    an injector having high and low pressure stages, which communicates via said high pressure stage in the steam phase with said separator and has an outlet from which the water is drawn to the heat- and water supply systems; a pipeline for transporting the water after it is used in the heat supply system and communicating with said high pressure stage;
    a heat exchanger having a heated and cooled sides and communicating in the brine fluid phase transported along said cooled side with said separator and said jet pump;
    a fresh water source communicating with said heated side of said heat exchanger which, in turn, communicates with said high pressure stage of said injector;
    a heat pump having the first inlet and outlet from the cooling side, and the second inlet and outlet from the heating side, water being fed to said first inlet after it is used in the heat supply system, said first outlet communicates with said water supply branch pipe, said second inlet communicates with said outlet of said jet pump, said second outlet communicates with the well for pumping the brine fluid phase.

2. A plant according to claim 1, wherein said heat pump comprises:
    an evaporator having a heated side;
    a condenser having a cooled side communicating with said heated side of said evaporator by the circuit of the intermediate heat transfer agent;
    a throttle valve arranged in said circuit of the intermediate heat transfer agent upstream said evaporator in the direction of the intermediate heat transfer agent circulation;
    a compressor arranged in said circuit of the intermediate heat transfer agent downstream said evaporator in the direction of the intermediate heat transfer agent circulation and furnished with a hydraulic drive communicating with said outlet of said injector.

* * * * *